(12) United States Patent
Ukawa

(10) Patent No.: US 11,994,965 B2
(45) Date of Patent: May 28, 2024

(54) STORAGE SYSTEM, FAILOVER CONTROL METHOD, AND RECORDING MEDIUM

(71) Applicant: Hitachi, Ltd., Tokyo (JP)

(72) Inventor: Hitoshi Ukawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 269 days.

(21) Appl. No.: 17/688,000

(22) Filed: Mar. 7, 2022

(65) Prior Publication Data
US 2022/0398175 A1    Dec. 15, 2022

(30) Foreign Application Priority Data

Jun. 9, 2021    (JP) ................................. 2021-096500

(51) Int. Cl.
| | | |
|---|---|---|
| G06F 11/07 | (2006.01) | |
| G06F 9/455 | (2018.01) | |
| G06F 11/20 | (2006.01) | |

(52) U.S. Cl.
CPC ...... G06F 11/2033 (2013.01); G06F 9/45558 (2013.01); *G06F 2009/45562* (2013.01); *G06F 2009/4557* (2013.01)

(58) Field of Classification Search
CPC ............ G06F 11/2033; G06F 11/3006; G06F 11/3433; G06F 11/1484; G06F 9/45558; G06F 2009/45562; G06F 2009/4557; G06F 16/182; G06F 2201/81
See application file for complete search history.

(56) References Cited

U.S. PATENT DOCUMENTS

2018/0157522 A1*  6/2018  Bafna ................... G06F 16/182

* cited by examiner

*Primary Examiner* — Matthew M Kim
*Assistant Examiner* — Kyle Emanuele
(74) *Attorney, Agent, or Firm* — MATTINGLY & MALUR, PC

(57) ABSTRACT

Failover is performed appropriately when a failure occurs in a physical server. In a plurality of physical servers of a storage system, one or more protocol VMs and one or more file system VMs are created. The protocol VMs perform processing related to a protocol for a file storage with a client via a front-end network. The file system VMs perform processing related to management of files in the file storage. A first physical server causes, when a failure occurs in a second physical server, a physical server other than the second physical server to operate a file system VM to be operated in place of the file system VM of the second physical server, and controls the protocol VM of the physical server other than the second physical server to perform processing to be performed by the protocol VM of the second physical server.

8 Claims, 13 Drawing Sheets

FIG. 4

File system VM management table 161

| # | Item | Update | Reference | |
|---|---|---|---|---|
| 1 | File system VM identifier | Hypervisor | Hypervisor | 161a |
| 2 | Physical server identifier | Hypervisor | Hypervisor | 161b |
| 3 | Allocated CPU number | Hypervisor | Hypervisor | 161c |
| 4 | Allocated memory size | Hypervisor | Hypervisor | 161d |
| 5 | CPU usage rate | Filesystem VM | Hypervisor | 161e |
| 6 | Memory usage amount | Filesystem VM | Hypervisor | 161f |

FIG. 5

Protocol VM management table 162

| # | Item | Update | Reference | |
|---|---|---|---|---|
| 1 | Protocol VM identifier | Hypervisor | Hypervisor | 162a |
| 2 | Physical server identifier | Hypervisor | Hypervisor | 162b |
| 3 | CIFS connection number | Protocol VM | Hypervisor | 162c |
| 4 | NFS connection number | Protocol VM | Hypervisor | 162d |
| 5 | Allocated CPU number | Hypervisor | Hypervisor | 162e |
| 6 | Allocated memory size | Hypervisor | Hypervisor | 162f |
| 7 | CPU usage rate | Protocol VM | Hypervisor | 162g |
| 8 | Memory usage amount | Protocol VM | Hypervisor | 162h |
| 9 | Status | Hypervisor | Hypervisor | 162i |

FIG. 6

Physical server management table 163

|   | Item | Update | Reference | |
|---|---|---|---|---|
| 1 | Physical server identifier | Hypervisor | Hypervisor | 163a |
| 2 | Allocated CPU number | Hypervisor | Hypervisor | 163b |
| 3 | Allocated memory size | Hypervisor | Hypervisor | 163c |

FIG. 7

Control information management table 164

| # | Item | |
|---|---|---|
| 1 | User connection upper limit value | 164a |
| 2 | User connection lower limit value | 164b |
| 3 | Scale-out upper limit value | 164c |
| 4 | Scale-in lower limit value | 164d |
| 5 | Scale-up upper limit value | 164e |
| 6 | Scale-down lower limit value | 164f |

FIG. 8

File system VM pair configuration table 165

| File system VM # | Active physical server # | Standby physical server # |
|---|---|---|
| File system VM 1 | Physical server 1 | Physical server 2 |
| File system VM 2 | Physical server 2 | Physical server 3 |
| File system VM 3 | Physical server 3 | Physical server 1 |

FIG. 9

Physical server status table 166

| Physical server # | Status |
|---|---|
| Physical server 1 | Normal |
| Physical server 2 | Normal |
| Physical server 3 | Normal |

# STORAGE SYSTEM, FAILOVER CONTROL METHOD, AND RECORDING MEDIUM

CROSS-REFERENCE TO PRIOR APPLICATION

This application relates to and claims the benefit of priority from Japanese Patent Application No. 2021-96500 filed on Jun. 9, 2021, the entire disclosure of which is incorporated herein by reference.

BACKGROUND

The present disclosure relates to a technique for failover of a virtual machine when a failure occurs in a physical server in a storage system including a plurality of physical servers.

For example, there is known an HCI (Hyper-Converged Infrastructure) system including one or more physical servers that virtualize the basic functions of storages and network devices thus to be implemented. In the HCI system, a virtual machine (VM) that performs various functions is created on the physical server by control software (a hypervisor) for managing the virtual machines. For example, in a physical server, a virtual machine (block storage VM) that provides a block storage function for a storage device and a virtual machine (file storage VM) that provides a file storage function are created.

For example, U.S. Patent Application Publication No. 2018/0157522 discloses a technique for scaling up, scaling down, scaling in, and scaling out a virtual file server based on the throughput and the like of the virtual file server.

SUMMARY

According to the technique disclosed in U.S. Patent Application Publication No. 2018/0157522, when the load of a virtual file server increases, the resources are controlled in units of virtual file servers.

For example, when a failure occurs in a physical server in which such a virtual file server is configured, failover to another physical server is performed in units of virtual file servers. In this case, the failover destination physical server needs to have a considerable amount of resources required for the virtual file server. Further, failover occurring as units of virtual file servers may cause a risk of increasing the load on the failover destination physical server.

The present disclosure has been made in view of the foregoing, and an object of the present disclosure is to provide a technique for performing an appropriate failover when a failure occurs in a physical server.

In order to achieve the above object, a storage system according to one aspect is a storage system including a plurality of physical servers. In a plurality of physical servers, one or more protocol virtual machines and one or more file system virtual machines are created to which resources of the physical servers are allocated, the protocol virtual machines performing processing related to a protocol for a file storage with a client via a network, the file system virtual machines performing processing related to file management in the file storage. A first physical server, when a failure occurs in a second physical server, causes a physical server other than the second physical server to operate an alternative file system virtual machine to be operated in place of the file system virtual machine of the second physical server, and controls the protocol virtual machine of the physical server other than the second physical server to perform processing to be performed by the protocol virtual machine of the second physical server.

BRIEF DESCRIPTION OF THE DRAWINGS

FIG. 4 illustrates a configuration of a file system VM management table according to the embodiment;
FIG. 5 illustrates a configuration of a protocol VM management table according to the embodiment;
FIG. 6 illustrates a configuration of a physical server management table according to the embodiment;
FIG. 7 illustrates a configuration of a control information management table according to the embodiment;
FIG. 8 illustrates a configuration of a file system VM pair configuration table according to the embodiment;
FIG. 9 illustrates a configuration of a physical server status table according to the embodiment.

DETAILED DESCRIPTION

Embodiments will be described with reference to the drawings. Note that the embodiments described below do not limit the invention according to the claims, and all of the elements and combinations thereof described in the embodiments may not be mandatory to achieve the object of the present invention.

In the following description, information may be expressed as "AAA table". However, the information may be expressed in any data structure. In other words, the "AAA table" can be referred to as "AAA information" to imply that the information does not depend on any data structure.

Further, in the following description, processing may be described using a "program" as an operating subject. However, since the program is executed by a processor (e.g., a CPU (Central Processing Unit)) to perform predetermined processing by using a storage unit (e.g., a memory) and/or an interface device as appropriate, the operating subject of processing may be the processor (or a device or system including the processor). The processor may also include a hardware circuit that performs some or all of the processing. The program may be installed from a program source into an apparatus such as a computer. The program source may be, for example, a recording medium that can be read by a program distribution server or a computer (e.g., a portable recording medium). Further, in the following description, two or more programs may be implemented as one program, or one program may be implemented as two or more programs.

Figure 1:
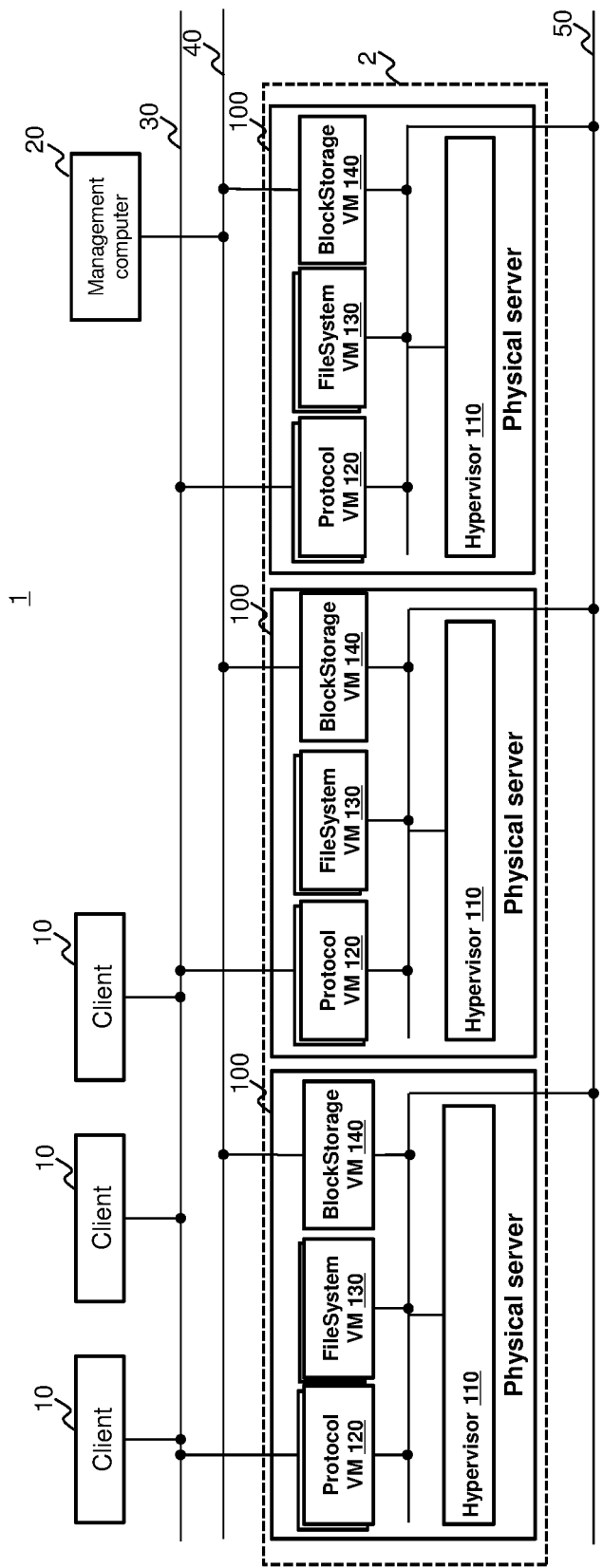
FIG. 1 is an overall configuration diagram of a computer system according to an embodiment.

FIG. 1 is an overall configuration diagram of a computer system according to an embodiment.

A computer system 1 includes one or more clients 10, a management computer 20, and a storage system 2. The storage system. 2 includes a plurality of physical servers 100.

The client 10 performs various types of processing by using data (e.g., a file) stored in the storage system 2. The management computer 20 performs processing of managing the storage system 2.

The physical server 100 includes VMs (virtual machines) including one or more protocol VMs 120, a plurality of file systems VM 130, and a block storage VM 140, and a hypervisor 110 that controls each of the VMs (120 to 140).

The one or more clients 10 and the protocol VM 120 of the physical server 100 are coupled to each other via a front-end network 30. The front-end network 30 is, for example, a communication network such as a wired LAN (Local Area Network), a wireless LAN, and a WAN (Wide Area Network).

The management computer 20 and the block storage VM 140 of the physical server 100 are coupled to each other via a management network 40. The management network 40 is, for example, a communication network such as a wired LAN, a wireless LAN, or a WAN.

The hypervisors 110 and the VMs (120 to 140) of the physical servers 100 are coupled via an internode network 50. The internode network 50 is, for example, a communication network such as a wired LAN, a wireless LAN, or a WAN.

Note that, in the present embodiment, the front-end network 30, the management network 40, and the internode network 50 are separate networks, but for example, some of the networks may be one network.

Figure 2:
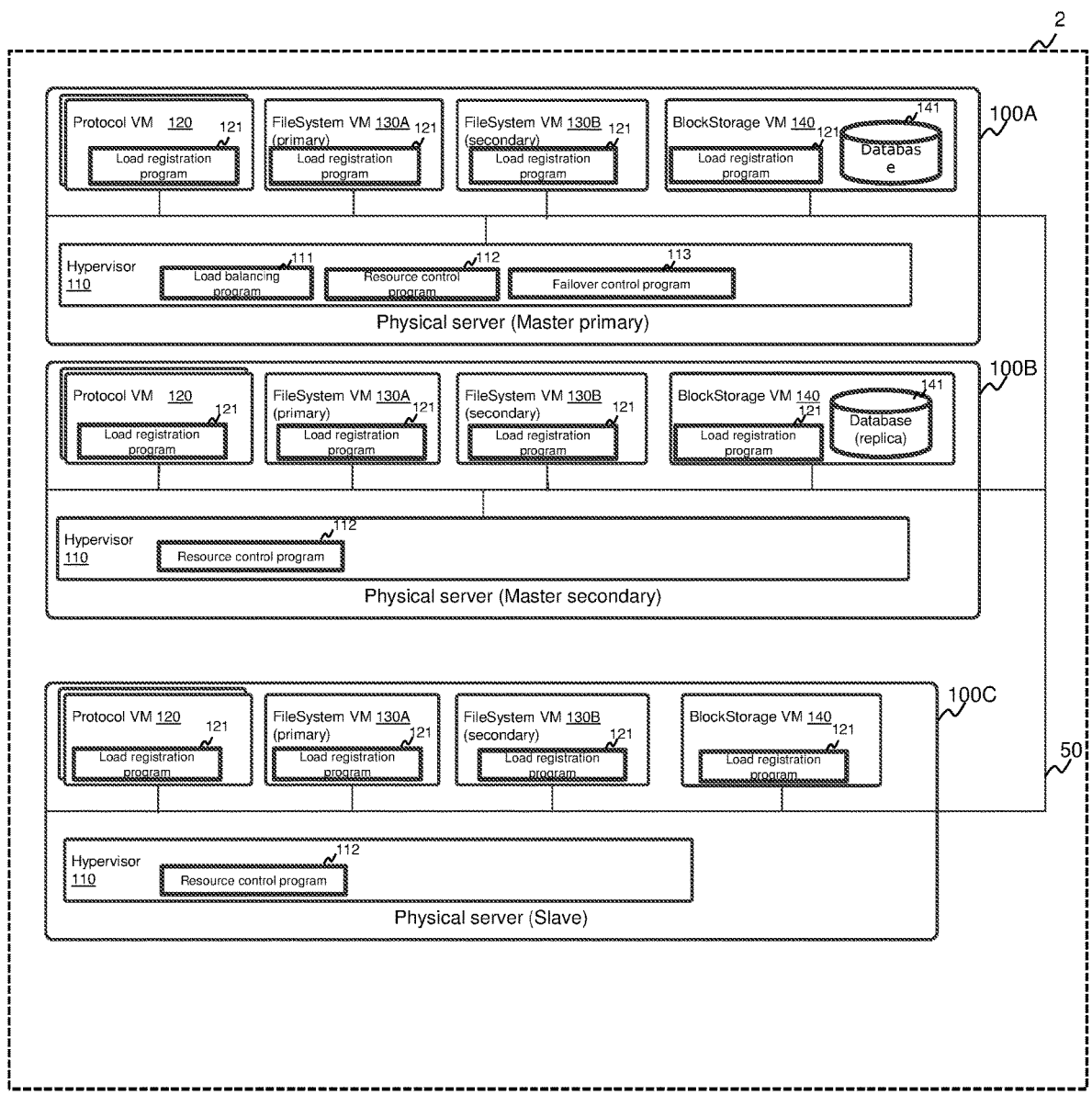
FIG. 2 is an overall configuration diagram of a storage system according to the embodiment.

FIG. 2 is an overall configuration diagram of the storage system according to the embodiment.

A storage system 2 includes a plurality of physical servers 100 that form a cluster of a distributed file system. In the example of FIG. 2, the storage system 2 includes a physical server 100A, a physical server 100B, and a physical server 100C.

The physical server 100A (an example of a first physical server) is a physical server that serves as a master primary to control the physical servers that form the cluster of the distributed file system. As such, a cluster of a distributed file system includes, for example, one physical server 100 that serves as a master primary.

The physical server 100A includes a hypervisor 110, one or more protocol VMs 120, a file system VM 130A, a file system VM 130B (examples of an alternative file system VM), and a block storage VM 140.

The hypervisor 110 creates and deletes a VM, allocates a resource to a VM, and when a failure occurs in a physical server 100, controls failover of the VM(s) of the physical server in which the failure occurs. The hypervisor 110 executes a load balancing program 111, a resource control program 112, and a failover control program 113. The load balancing program 111 is a program for performing processing of balancing the load due to a difference in the number of connections of clients 10 between the protocol VMs 120. The resource control program 112 is a program for performing processing of controlling the allocation of resources to the protocol VMs 120 and the file system VMs 130 (130A, 130B). The failover control program 113 is a program for performing processing of controlling failover of the VM(s) of a physical server 100 in which a failure occurs.

The protocol VM 120 performs a part of the functions of the file storage, for example, a function that follows a protocol for a file system (e.g., NFS (Network File System) and/or CIFS (Common Internet File System)) with the client 10 via the front-end network 30. The processing to be performed by the protocol VM 120 includes, for example, processing for user login, lock management between users, user mapping between Windows (registered trademark) and Linux (registered trademark), and the like. The protocol VM 120 executes a load registration program 121. The load registration program 121 is a program for acquiring information on the load of the own VM (i.e., the protocol VM 120) and registering the information in a database 141 described later.

The file system VM 130A is an active (primary) file system VM that actually works, and performs a part of the functions of the file storage (except for the functions of the protocol VM 120), for example, a function for managing files (function for conversion between file I/O and block I/O, etc.). The file system VM 130A executes a load registration program 121. The load registration program 121 is a program for acquiring information on the load of the own VM (i.e., the file system VM 130A) and registering the information in the database 141 described later. The protocol VM 120 and the file system VM 130A provide the functions required for the file storage.

In the present embodiment, the file system VM 130A is configured to make a pair with the standby (secondary) file system VM 130B, which has the same functions as the file system VM 130A, of another physical server (the physical server 100B in the example of FIG. 2) that operates when a failure occurs in the file system VM 130A.

The file system VM 130B has the same functions as the file system VM 130A of still another physical server 100 (the physical server 100C in the example of FIG. 2) and is configured to make a pair with that file system VM 130A. In other words, the file system VM 130B is a standby file system VM that operates when a failure occurs in the physical server 100 including that file system VM 130A. Note that, in the present embodiment, the file system VM 130B does not perform the function for managing files (function for conversion between file I/O and block I/O, etc.) when the file system VM 130A normally works, so that, in the normal state, the amount of allocated resources (allocated resource amount) is smaller than the allocated resource amount of the file system VM 130A of the pair. Thus, it is possible to secure a large amount of free resources in the physical server 100.

The block storage VM 140 functions as a block storage for storing and managing data in a storage device 154 described later in block units. The block storage VM 140 has the database 141. The database 141 stores various types of information. The database 141 is readable and writable by each physical server 100 of the storage system 2. In the present embodiment, the database 141 stores a file system VM management table 161, a protocol VM management table 162, a physical server management table 163, a control information management table 164, a file system VM pair configuration table 165, and a physical server status table 166, which will be described later. The block storage VM 140 executes a load registration program 121. The load registration program 121 is a program for acquiring information on the load of the own VM (i.e., the block storage VM 140) and registering the information in the database 141.

The physical server 100B (an example of a second physical server) is a physical server that serves as a master secondary (secondary master) that serves as the master primary when a failure occurs in the physical server 100A that serves as a master primary in the distributed file system. A cluster of the distributed file system may include, for example, up to two physical servers that each serve as the master secondary.

The physical server 100B includes a hypervisor 110, one or more protocol VMs 120, a file system VM 130A, a file system VM 130B (examples of an alternative file system VM), and a block storage VM 140. When the hypervisor 110 of the physical server 100B serves as the master secondary, the hypervisor 110 executes the resource control program 112 and does not execute the load balancing program 111 and the failover control program 113. Note that, when the physical server 100B serves as the master primary due to a failure occurring in the physical server 100A, the load balancing program 111 and the failover control program 113 are executed.

The file system VM 130B is a file system VM that has the same functions as the file system VM 130A of another physical server 100 (the physical server 100A in the example of FIG. 2) and is configured to make a pair with that file system VM 130A.

A database 141 of the block storage VM 140 of the physical server 100B is a replica of the database 141 of the block storage VM 140 of the physical server 100A. For example, the block storage VM 140 of the physical server 100A copies the data in its own database 141 to the database 141 of the block storage VM 140 of the physical server 100B at a predetermined timing.

The physical server 100C (an example of the second physical server) is a physical server (slave) other than the physical servers that each serve as a master (master primary and master secondary) in the distributed file system. The physical server 100C includes a hypervisor 110, one or more protocol VMs 120, a file system VM 130A, a file system VM 130B (alternative file system VM), and a block storage VM 140. Note that the block storage VM 140 of the physical server 100C may not include a database 141.

The file system VM 130B is a file system VM that has the same functions as the file system VM 130A of another physical server 100 (the physical server 100B in the example of FIG. 2) and is configured to make a pair with that file system VM 130A. As described above, in the present embodiment, the secondary file systems VM 130B are distributed and arranged over a plurality of physical servers.

Figure 3:
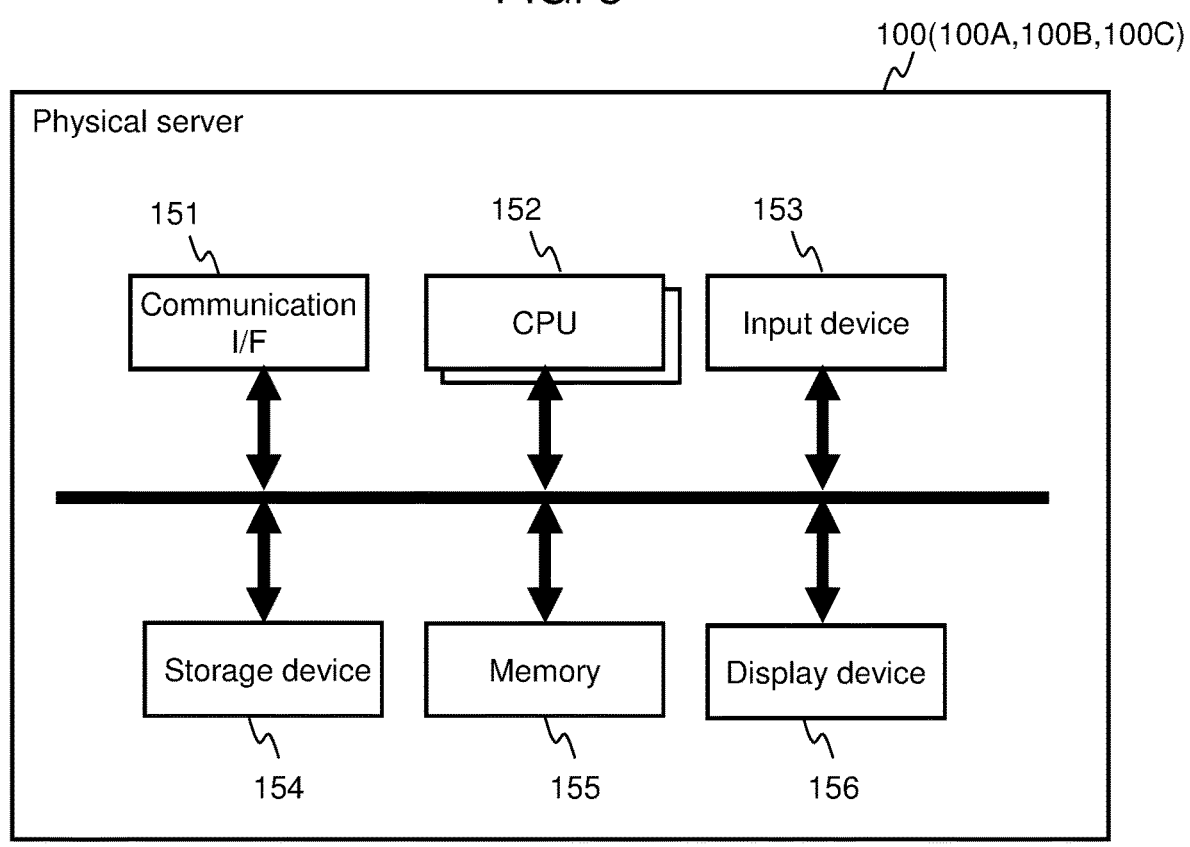
FIG. 3 is a configuration diagram of a physical server according to the embodiment.

FIG. 3 is a configuration diagram of the physical server according to the embodiment.

The physical server 100 (100A, 100B, 100C) is composed of, for example, a PC (Personal Computer) or a general-purpose server. The physical server 100 includes resources such as a communication I/F 151, one or more CPUs (Central Processing Units) 152, an input device 153, the storage device 154, a memory 155, and a display device 156.

The communication I/F 151 is an interface, such as a wired LAN card or a wireless LAN card, to communicate with other devices (e.g., the clients 10, the management computer 20, or the other physical servers 100) via the network (30, 40, 50).

The CPU 152 performs various types of processing according to a program stored in the memory 155 and/or the storage device 154. In the present embodiment, the CPU 152 is allocated to each VM. The unit for allocation to each VM may be the number of CPUs 152.

The memory 155 is, for example, a RAM (RANDOM ACCESS MEMORY), and stores a program to be executed by the CPU 152 and necessary information. In the present embodiment, the memory 155 is used to be allocated to each VM.

The storage device 154 is, for example, a hard disk, a flash memory, or the like, and stores a program to be executed by the CPU 152, data to be used by the CPU 152, a file of user data to be used by the clients 10, and the like. In the present embodiment, the storage device 154 stores programs for realizing the hypervisor 110 (e.g., the load balancing program 111, the resource control program 112, and the failover control program 113 is included), a program for causing a VM created by the hypervisor 110 to function as a protocol VM 120 (e.g., the load registration program 121), a program for causing a VM created by the hypervisor 110 to function as a file system VM 130 (e.g., the load registration program 121), a program for causing a VM created by the hypervisor 110 to function as a block storage VM 140, and the like. Further, the storage device 154 stores data managed in the database 141 of the block storage VM 140.

The input device 153 is, for example, a mouse, a keyboard, or the like, and receives input of information from the user. The display device 156 is, for example, a display, and displays and outputs various types of information.

Next, various types of information stored in the database 141 of the block storage VM 140 of the physical server 100A will be described.

First, the file system VM management table 161 will be described.

FIG. 4 illustrates a configuration of the file system VM management table according to the embodiment.

The file system VM management table 161 is a table for managing information of the file systems VM 130 (130A, 130B) in the storage system 2, and stores an entry for each file system VM 130.

The entry in the file system VM management table 161 includes items of a file system VM identifier 161a, a physical server identifier 161b, an allocated CPU number 161c, an allocated memory size 161d, a CPU usage rate 161e, and a memory usage amount 161f.

In the file system VM identifier 161a, an identifier (a file system VM identifier) for identifying the file system VM 130 corresponding to the entry is stored. Note that the file system VM 130A and the file system VM 130B, which are configured as a pair, have the same file system VM identifier. In the physical server identifier 161b, an identifier (a physical server identifier) for uniquely identifying the physical server 100 in which the file system VM 130 corresponding to the entry is created is stored. In the allocated CPU number 161c, the number of CPUs 152 allocated to the file system VM 130 corresponding to the entry is stored. In the allocated memory size 161d, a size of the memory 155 allocated to the file system VM 130 corresponding to the entry is stored. In the CPU usage rate 161e, a usage rate (a CPU usage rate) of the CPUs 152 allocated to the file system VM 130 corresponding to the entry is stored. In the memory usage amount 161f, a size (a memory usage amount) used in the memory 155 allocated to the file system VM 130 corresponding to the entry is stored.

In the file system VM management table 161, the values of the file system VM identifier 161a, the physical server identifier 161b, the allocated CPU number 161c, and the allocated memory size 161d are updated and referred to by the hypervisor 110. The values of the CPU usage rate 161e and the memory usage amount 161f are updated by the file system VM 130 and referred to by the hypervisor 110.

Next, the protocol VM management table 162 will be described.

FIG. 5 illustrates a configuration of the protocol VM management table according to the embodiment.

The protocol VM management table 162 is a table for managing information of the protocol VM 120 for the storage system 2, and stores an entry for each protocol VM 120.

The entry in the protocol VM management table 162 includes items of a protocol VM identifier 162a, a physical server identifier 162b, a CIFS connection number 162c, an NFS connection number 162d, an allocated CPU number 162e, an allocated memory size 162f, a CPU usage rate 162g, a memory usage amount 162h, and a status 162i.

In the protocol VM identifier 162a, an identifier (a protocol VM identifier) for uniquely identifying the protocol VM 120 corresponding to the entry is stored. In the physical server identifier 162b, an identifier (a physical server identifier) for uniquely identifying the physical server 100 in which the protocol VM 120 corresponding to the entry is created is stored. In the CIFS connection number 162c, the number of connections of clients using the CIFS to the protocol VM 120 corresponding to the entry is stored. In the NFS connection number 162d, the number of connections of clients using the NFS to the protocol VM 120 corresponding to the entry is stored. In the allocated CPU number 162e, the number of CPUs 152 allocated to the protocol VM 120 corresponding to the entry is stored. In the allocated memory size 162f, a size of the memory 155 allocated to the protocol VM 120 corresponding to the entry is stored. In the allocated CPU usage rate 162g, a usage rate of the CPUs 152 allocated to the protocol VM 120 corresponding to the entry is stored. In the memory usage amount 162h, a size used in the memory 155 allocated to the protocol VM 120 corresponding to the entry is stored. In the status 162i, information on whether or not the protocol VM 120 corresponding to the entry is operating normally is stored. In the status 162i, abnormal is set when FO (failover) is performed.

In the protocol VM management table 162, the values of the protocol VM identifier 162a, the physical server identifier 162b, the allocated CPU number 162e, the allocated memory size 162f and the status 162i are updated and referred to by the hypervisor 110. The values of the CIFS connection number 162c, the NFS connection number 162d, the CPU usage rate 162g, and the memory usage amount 162h are updated by the protocol VM 120 and referred to by the hypervisor 110.

Next, the physical server management table 163 will be described.

FIG. 6 illustrates a configuration of the physical server management table according to the embodiment.

The physical server management table 163 is a table for managing information of the physical servers 100 in the storage system 2, and stores an entry for each physical server 100.

The entry in the physical server management table 163 includes items of a physical server identifier 163a, an allocated CPU number 163b, and an allocated memory size 163c.

In the physical server identifier 163a, an identifier (a physical server identifier) for uniquely identifying the physical server 100 corresponding to the entry is stored. In the allocated CPU number 163b, the number of CPUs 152 that can be allocated in the physical server 100 corresponding to the entry is stored. In the allocated memory size 163c, a size of the memory 155 that can be allocated in the physical server 100 corresponding to the entry is stored.

In the physical server management table 163, the values of the physical server identifier 163a, the allocated CPU number 163b, and the allocated memory size 163c are updated and referred to by the hypervisor 110.

Next, the control information management table 164 will be described.

FIG. 7 illustrates a configuration of the control information management table according to the embodiment.

The control information management table 164 is a table for managing threshold values used for processing, and includes items of a user connection upper limit value 164a, a user connection lower limit value 164b, a scale-out upper limit value 164c, a scale-in lower limit value 164d, a scale-up upper limit value 164e, and a scale-down lower limit value 164f.

In the user connection upper limit value 164a, an upper limit value (a user connection upper limit value) of the number of user connections for determining that the load of the protocol VM 120 is high in the load balancing program 111 is stored. In the user connection lower limit value 164b, a lower limit value (a user connection lower limit value) of the number of user connections for determining that the load of the protocol VM 120 is low in the load balancing program 111 is stored. In the scale-out upper limit value 164c, an upper limit value (a scale-out upper limit value) for determining that the load of the protocol VM 120 is high in the resource control program 112 is stored. Note that, when the load of the protocol VM 120 is higher than this upper limit value, A scale-out is performed, that is, a new protocol VM 120 is added. In the scale-in lower limit value 164d, a lower limit value (a scale-in upper limit value) for determining that the load of the protocol VM 120 is low in the resource control program 112 is stored. Note that, when the load of the protocol VM 120 is lower than this lower limit value, a scale-in is performed, that is, the protocol VM 120 is deleted.

In the scale-up upper limit value 164e, an upper limit value (a scale-up upper limit value) for determining that the load of the file system VM 130 is high in the resource control program 112 is stored. Note that, when the load of the file system VM 130 is higher than this upper limit value, a scaled-up is performed, that is, a resource is added to the file system VM 130. In the scale-down lower limit value 164f, a lower limit value (a scale-down lower limit value) for determining that the load of the file system VM 130 is low in the resource control program 112 is stored. Note that, when the load of the file system VM 130 is lower than this lower limit value, a scale-down is performed, that is, a resource of the file system VM 130 is released.

Next, the file system VM pair configuration table 165 will be described.

FIG. 8 illustrates a configuration of the file system VM pair configuration table according to the embodiment.

The file system VM pair configuration table 165 is a table for managing pairs (redundant pairs) of active/standby file system VMs, and stores an entry for each pair of file system VMs.

The entry in the file system VM pair configuration table 165 includes items for a file system VM #165a, an active physical server #165b, and a standby physical server #165c.

In the file system VM #165a, an identifier of the file system VMs of the pair corresponding to the entry is stored. In the active physical server #165b, a physical server identifier of the physical server 100 including the active file system VM 130A in the pair of file system VMs corresponding to the entry is stored. In the standby physical server #165c, a physical server identifier of the physical server 100 including the standby file system VM 130B in the pair of file system VMs corresponding to the entry is stored.

Next, the physical server status table 166 will be described.

FIG. 9 illustrates a configuration of the physical server status table according to the embodiment.

The physical server status table 166 is a table for managing the operating status of each physical server 100, and stores an entry for each physical server 100.

The entry in the physical server status table 166 includes items of a physical server #166a and a status 166b.

In the physical server #166a, a physical server identifier of the physical server 100 corresponding to the entry is stored. In the status 166b, the operating status (e.g., normal or closed) of the physical server 100 corresponding to the entry is stored.

Next, a processing operation of the storage system 2 will be described.

First, load registration processing will be described.

Figure 10:
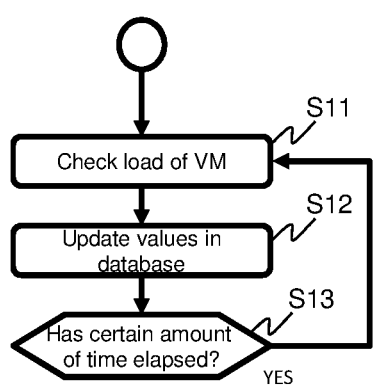
FIG. 10 is a flowchart of load registration processing according to the embodiment.

FIG. 10 is a flowchart of the load registration processing according to the embodiment.

The load registration processing is performed by the CPU 152, which is allocated to each of the protocol VM 120, the file system VM 130A, the file system VM 130B, and the block storage VM 140, executing the load registration program 121.

The load registration program 121 checks various types of loads of the VM that executes the load registration program 121 (step S11). For example, the load registration program 121 executed by the protocol VM 120 checks the number of CIFS connections, the number of NFS connections, the CPU usage rate, and the memory usage amount in the protocol VM 120. Further, the load registration program 121 executed by the file system VM 130 (130A, 130B) checks the CPU usage rate and the memory usage amount in the file system VM 130. Further, the load registration program 121 executed by the block storage VM 140 checks the CPU usage rate and the memory usage amount in the block storage VM 140.

Then, the load registration program 121 updates the corresponding item in the corresponding table of the database 141 of the master primary physical server 100 based on the checked types of loads (step S12). Then, the load registration program 121 determines whether or not a certain amount of time has elapsed (step S13), and when it is determined that a certain amount of time has elapsed (step S13: YES), the load registration program 121 proceeds the processing to step S11.

By the load registration processing executed in the protocol VM 120, the file system VM 130, and the block storage VM 140, the latest load information of each VM is stored in the database 141 of the master primary physical server 100.

Next, load balancing processing will be described.

Figure 11:
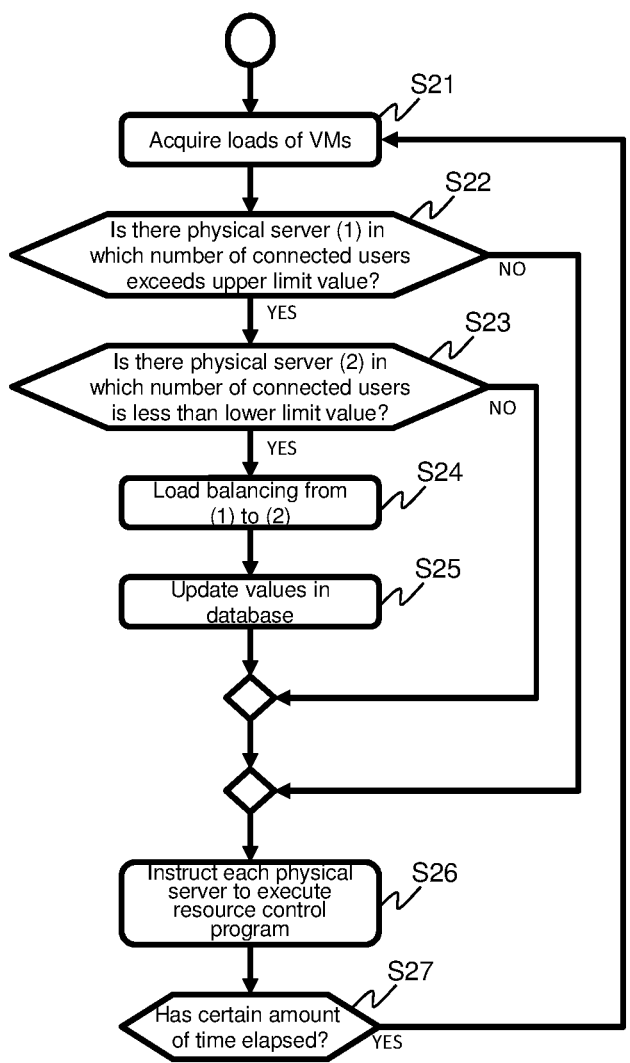
FIG. 11 is a flowchart of load balancing processing according to the embodiment.

FIG. 11 is a flowchart of the load balancing processing according to the embodiment.

The load balancing processing is performed by the CPU 152, which is allocated to the hypervisor 110 of the master primary physical server 100, executing the load balancing program 111.

The load balancing program 111 acquires information on the load of each VM in the storage system 2 from the database 141 (step S21).

Then, the load balancing program 111 determines whether or not there is a physical server (hereinafter, referred to as a physical server (1)) in which the number of connected users (CIFS connection number+NFS connection number) exceeds the upper limit value (the user connection upper limit value of the user connection upper limit value 164a in the control information management table 164) (step S22).

As a result, when there is a physical server in which the number of connections exceeds the user connection upper limit value (step S22: YES), the load balancing program 111 proceeds the processing to step S23. When there is no physical server in which the number of connections exceeds the user connection upper limit value (step S22: NO), the load balancing program 111 proceeds the processing to step S26.

In step S23, the load balancing program 111 determines whether or not there is a physical server (hereinafter, referred to as a physical server (2)) in which the number of connected users is less than the lower limit value (the user connection lower limit value of the user connection lower limit value 164b in the control information management table 164).

As a result, when there is a physical server in which the number of connections is less than the user connection lower limit value (step S23: YES), the load balancing program 111 proceeds the processing to step S24. When there is no physical server in which the number of connections is lower than the user connection lower limit value (step S23: NO), the load balancing program 111 proceeds the processing to step S26.

In step S24, the load balancing program 111 balances the load from the physical server (1) to the physical server (2). Specifically, the load balancing program 111 performs transparent failover from the protocol VM 120 of the physical server (1) to the protocol VM 120 of the physical server (2) for some processes for the connecting users.

Then, the load balancing program 111 updates the values in the corresponding table in the database 141 based on the load balancing results (step S25).

In step S26, the load balancing program 111 instructs the hypervisor 110 of each physical server 100 to execute the resource control program 112.

Then, the load balancing program 111 determines whether or not a certain amount of time has elapsed (step S27), and when it is determined that a certain amount of time has elapsed (step S27: YES), the load balancing program 111 proceeds the processing to step S21.

According to the load balancing processing described above, the number of user connections can be balanced between the physical servers 100, and the loads of the physical servers 100 can be balanced.

Next, resource control processing will be described.

Figure 12:
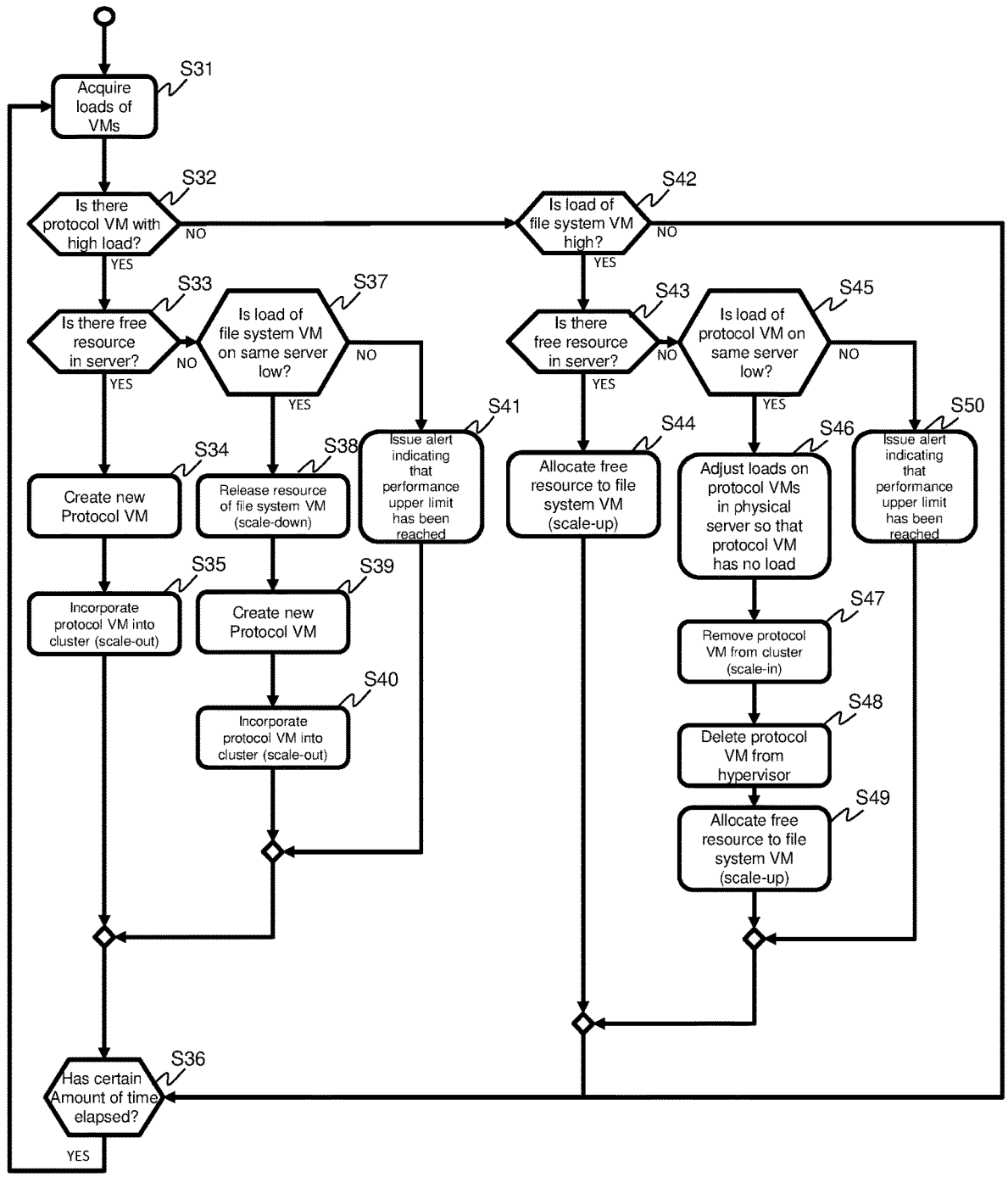
FIG. 12 is a flowchart of resource control processing according to the embodiment.

FIG. 12 is a flowchart of the resource control processing according to the embodiment.

The resource control processing is performed by the CPU 152, which is allocated to the hypervisor 110 of each physical server 100, executing the resource control program 112.

The resource control program 112 acquires from the database 141 information on the load of each VM on a physical server 100 in which the hypervisor 110 executing the resource control program 112 (may be referred to as the own physical server in the description of this processing) is exist (step S31).

Then, the resource control program 112 determines whether or not there is a protocol VM 120 on the physical server 100 having a high load, that is, whether or not there is a protocol VM 120 having a load equal to or higher than a predetermined load (step S32). For example, the resource control program 112 may determine that there is a protocol VM 120 with a high load when the protocol VM 120 satisfies any of the conditions that: the memory usage amount exceeds a predetermined threshold value, the CPU usage rate exceeds a predetermined threshold value, and the total number of connected users (CIFS connection number+ NFS connection number) exceeds a predetermined threshold value.

As a result, when the resource control program 112 determines that there is a protocol VM 120 with a high load (step S32: YES), the resource control program 112 proceeds the processing to step S33. When the resource control program 112 determines that there is no protocol VM 120 with a high load (step S32: NO), the resource control program 112 proceeds the processing to step S42.

In step S33, the resource control program 112 determines whether or not there is a free resource in the own physical server. Here, whether or not there is a free resource can be determined based on, for example, whether or not there is a difference between the number of allocated CPUs and the allocated memory size in the entry corresponding to the own physical server in the physical server management table 163 and the number of allocated CPUs and the allocated memory size of all VMs on the own physical server.

As a result, when it is determined that there is a free resource in the own physical server (step S33: YES), the resource control program 112 creates a new protocol VM 120 to which the free resource of the own physical server is allocated (step S34), and scales out the distributed file system by incorporating the created protocol VM 120 into the cluster of the distributed file system in the storage system 2 (step S35). Thus, it is possible to improve the efficiency of the processing performed by the protocol VM 120. Then, the resource control program 112 proceeds the processing to step S36.

In step S36, the resource control program 112 determines whether or not a certain amount of time has elapsed, and when it is determined that a certain amount of time has elapsed (step S36: YES), the resource control program 112 proceeds the processing to step S31.

On the other hand, when it is determined that there is no free resource in the own physical server (step S33: NO), the resource control program 112 determines whether or not the load of the file system VM 130 on the own physical server is low (step S37). For example, the resource control program 112 may determine that the load of the file system VM 130 is low when the memory usage amount of the file system VM 130 is equal to or lower than a predetermined threshold value and the CPU usage rate is equal to or lower than a predetermined threshold value.

As a result, when it is determined that the load of the file system VM 130 on the own physical server is low (step S37: YES), the resource control program 112 releases a part of the resources allocated to the file system VM 130 (scale-down) (step S38), creates a new protocol VM 120 to which the released resource is allocated (step S39), and scales out the distributed file system by incorporating the created protocol VM 120 into the cluster of the distributed file system in the storage system 2 (step S40). Thus, it is possible to improve the efficiency of the processing performed by the protocol VM 120. Then, the resource control program 112 proceeds the processing to step S36.

On the other hand, when it is not determined that the load of the file system VM 130 on the own physical server is low (step S37: NO), the resource control program 112 issues an alert indicating that the performance upper limit of the own physical server has been reached (e.g., notifies the management computer 20) (step S41), and proceeds the processing to step S36.

In step S42, the resource control program 112 determines whether or not the load of the file system VM 130 on the own physical server is high, that is, whether or not the load of the file system VM 130 is equal to or higher than a predetermined load. For example, the resource control program 112 may determine that the load of the file system VM 130 is high when the memory usage amount of the file system VM 130 exceeds the predetermined threshold value and the CPU usage rate exceeds the predetermined threshold value.

As a result, when the resource control program 112 determines that the load of the file system VM 130 is high (step S42: YES), the resource control program 112 proceeds the processing to step S43. When the resource control program 112 determines that the load of the file system VM 130 is not high (step S42: NO), the resource control program 112 proceeds the processing to step S36.

In step S43, the resource control program 112 determines whether or not there is a free resource in the own physical server. Here, whether or not there is a free resource can be determined based on, for example, whether or not there is a difference between the number of allocated CPUs and the allocated memory size in the entry corresponding to the own physical server in the physical server management table 163 and the number of allocated CPUs and the allocated memory size of all VMs on the own physical server.

As a result, when it is determined that there is a free resource in the own physical server (step S43: YES), the resource control program 112 performs scale-up on the distributed file system by allocating the free resource of the own physical server to the file system VM 130 (step S44). Thus, it is possible to improve the efficiency of the processing performed by the file system VM 130. Then, the resource control program 112 proceeds the processing to step S36.

On the other hand, when it is determined that there is no free resource in the own physical server (step S43: NO), the resource control program 112 determines whether or not the load of the protocol VM 120 on the own physical server is low (step S45). For example, the resource control program 112 may determine that the load of the protocol VM 120 is low when the memory usage amount of the protocol VM 120 is equal to or lower than a predetermined threshold value, the CPU usage rate is equal to or lower than a predetermined threshold value, and the total number of connected users (CIFS connection number+NFS connection number) is equal to or lower than a predetermined threshold value.

As a result, when it is determined that the load of the protocol VM 120 on the own physical server is low (step S45: YES), the resource control program 112 adjusts the loads on the protocol VMs 120 in the own physical server so that at least one of the protocol VMs 120 has no load (step S46), and removes that protocol VM 120 having no load from the cluster of the distributed file system (scale-out) (step S47). Then, the resource control program 112 deletes the protocol VM 120 removed from the cluster from the VMs managed by the hypervisor 110 (step S48). Thus, the resource allocated to the protocol VM 120 will be released. Then, the resource control program 112 performs scale-up on the distributed file system by allocating the released resource to the file system VM 130 (step S49). Thus, it is possible to improve the efficiency of the processing performed by the file system VM 130. Then, the resource control program 112 proceeds the processing to step S36.

On the other hand, when it is not determined that the load of the protocol VM 120 on the own physical server is low (step S45: NO), the resource control program 112 issues an alert indicating that the performance upper limit of the own physical server has been reached (e.g., notifies the management computer 20) (step S50), and the resource control program 112 proceeds the processing to step S36.

Next, failover processing when a failure occurs in a physical server will be described.

Figure 13:
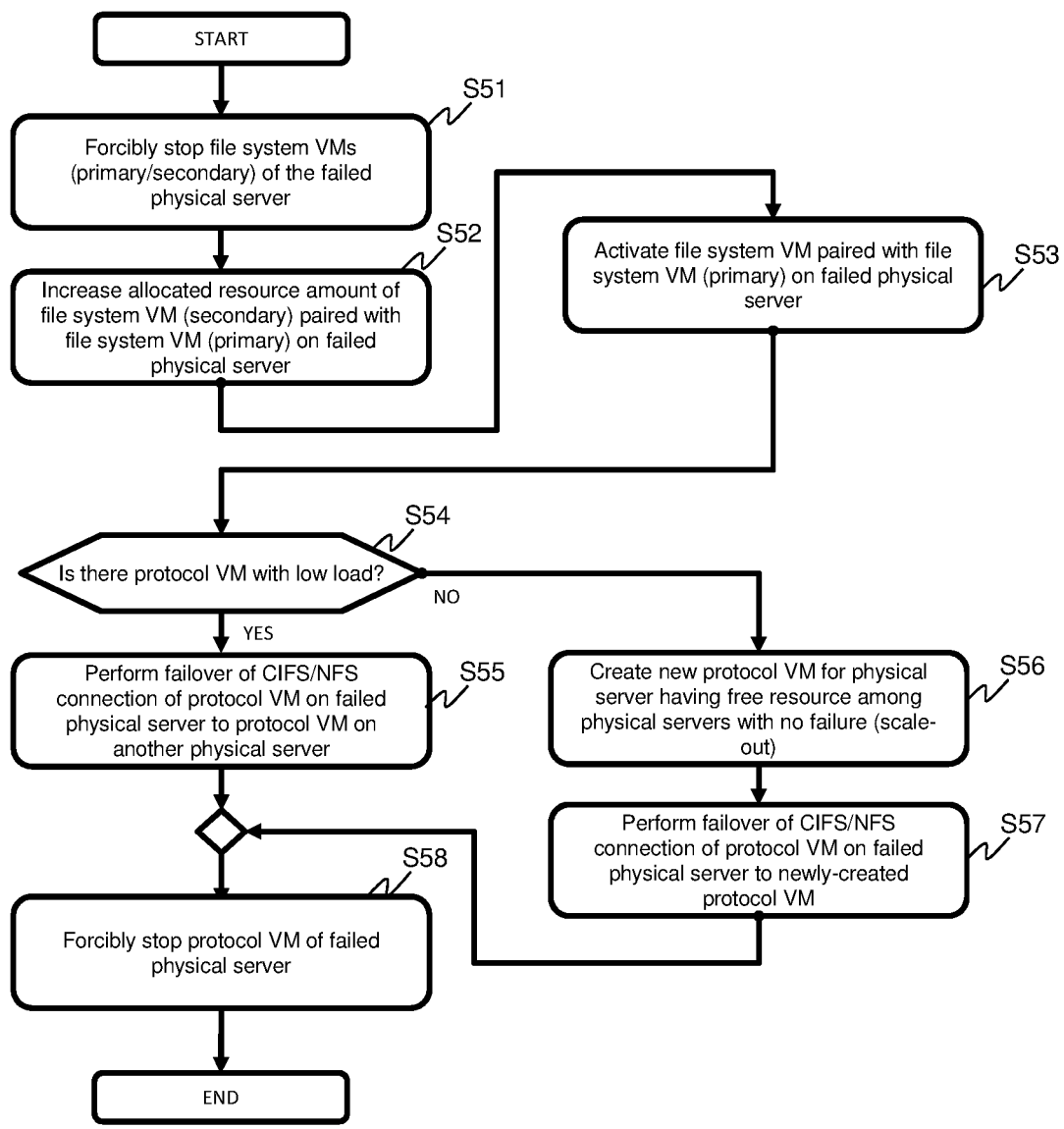
FIG. 13 is a flowchart of failover processing according to the embodiment.

FIG. 13 is a flowchart of the failover processing according to the embodiment.

The failover processing is performed by the CPU 152, which is allocated to the hypervisor 110 of the master primary physical server 100, executing the failover control program 113. The failover processing is performed, for example, when the failover control program 113 receives from the hypervisor 110 or each VM (120, 130, 140) a notification indicating that a failure has occurred in the physical server 100.

The failover control program 113 configures, to "closed", the status 166*b* for the physical server 100 in which the failure has occurred (referred to as the failed physical server) in the physical server status table 166, and forcibly stops the file systems VM 130A and 130B of the failed physical server (step S51).

Then, the failover control program 113 increases the amount of resources (allocated resource amount) allocated to the file system VM 130B paired with the primary file system VM 130A of the failed physical server (step S52). Specifically, the failover control program 113 instructs the hypervisor 110 of the physical server 100 including the file system VM 130B to increase the allocated resource amount for the file system VM 130B. Thus, the file system VM 130B can secure the resources necessary for performing the same processing as in the file system VM 130A.

Then, the failover control program 113 activates the file system VM 130B paired with the primary file system VM 130A of the failed physical server, and updates the corresponding entry in the file system VM pair configuration table 165 to this state (step S53).

Then, the failover control program 113 determines whether or not there is a protocol VM 120 with a low load in the physical servers 100 other than the failed physical server (step S54). Here, load determination processing for determining the load of each protocol VM 120 will be described later.

As a result, when there is a protocol VM 120 with a low load (step S54: YES), the failover control program 113 performs failover (transfer) of the process (CIFS/NFS connection process) processed by the protocol VM 120 of the failed physical server to a protocol VM 120 with a lower load (step S55), and then the failover control program 113 proceeds the processing to step S58. In this way, when there is a protocol VM 120 with a low load, an existing protocol VM 120 is took over the processing, so that it is possible to improve the resource utilization efficiency.

On the other hand, when there is no protocol VM 120 with a low load (step S54: NO), the failover control program 113 causes a physical server 100 having a free resource among the physical servers other than the failed physical server to create a new protocol VM 120, and scales out the distributed file system by incorporating the created protocol VM 120 into the cluster of the distributed file system in the storage system 2 (step S56). Note that whether or not there is a free resource in the physical servers can be determined by, for example, the same method as that described with reference to FIG. 12. Further, when there are a plurality of physical servers each having a free resource, the physical server having a larger amount of free resources may be used as the physical server where a protocol VM 120 is created.

Then, the failover control program 113 performs failover (transfer) of the process (CIFS/NFS connection process) processed by the protocol VM 120 of the failed physical server to the created protocol VM 120 (step S57), and the failover control program 113 proceeds the processing to step S58.

In step S58, the failover control program 113 forcibly stops the protocol VM 120 of the failed physical server, and then ends the processing.

Next, the load determination processing for determining the load of the protocol VM 120 used in step S54 will be described.

Figure 14:
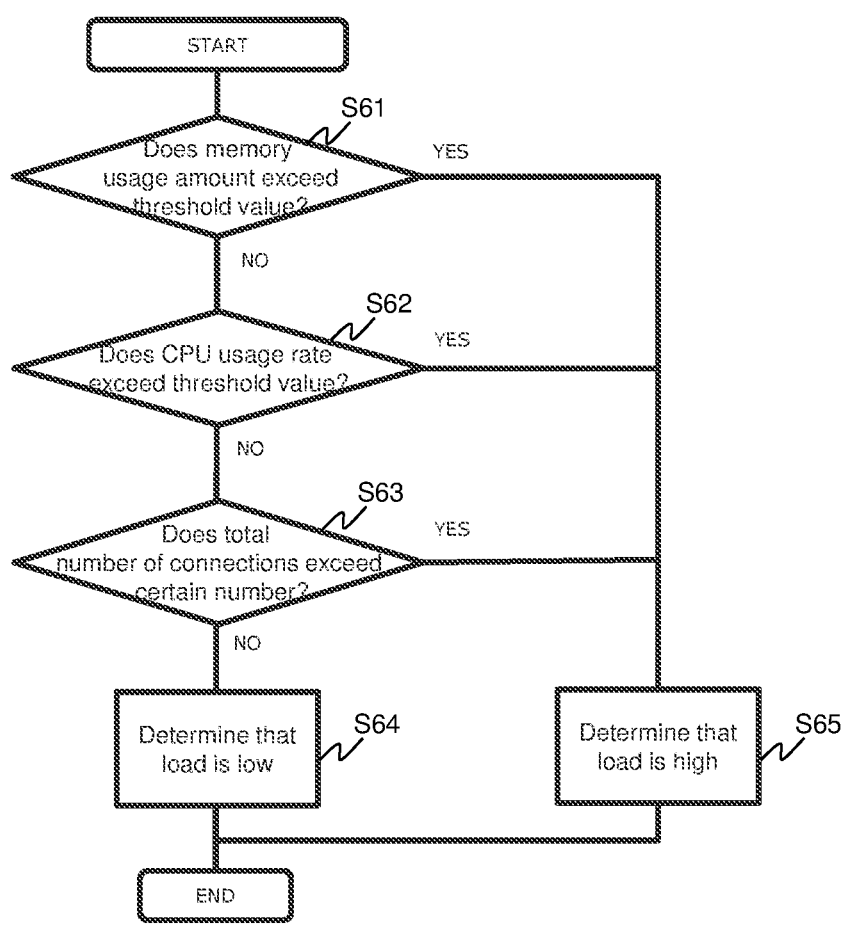
FIG. 14 is a flowchart of load determination processing according to the embodiment.

FIG. 14 is a flowchart of the load determination processing according to the embodiment.

In the present embodiment, the load determination processing is performed for each of the protocol VMs 120 of the physical servers other than the failed physical server. Here, the protocol VM 120 to be processed is referred to as the target protocol VM.

First, the failover control program 113 acquires the entry for the target protocol VM in the protocol VM management table 162, and determines whether or not the memory usage amount of the target protocol VM exceeds a predetermined threshold value (step S61).

As a result, when it is determined that the memory usage amount of the target protocol VM does not exceed the predetermined threshold value (step S61: NO), the failover control program 113 determines whether or not the CPU usage rate of the target protocol VM exceeds a predetermined threshold value (step S62).

As a result, when it is determined that the CPU usage rate of the target protocol VM does not exceed the predetermined threshold value (step S62: NO), the failover control program 113 determines whether or not the total number of connections (CIFS connection number+NFS connection number) to the target protocol VM exceeds a predetermined threshold value (step S63).

As a result, when it is determined that the total number of connections to the target protocol VM does not exceed the predetermined threshold value (step S63: NO), the failover control program 113 determines that the load of the target protocol VM is low (step S64), and then ends the processing.

On the other hand, when it is determined that the memory usage amount of the target protocol VM exceeds the predetermined threshold value (step S61: YES), when it is determined that the CPU usage rate of the target protocol VM exceeds the predetermined threshold value (step S62: YES), or when it is determined that the total number of connections to the target protocol VM exceeds the predetermined threshold value (step S63: YES), the failover control program 113 determines that the load of the target protocol VM is high (step S65), and then ends the processing.

Next, failover processing for the case where there is a protocol VM with a low load in the physical servers other than the failed physical server will be described in detail.

Figure 15:
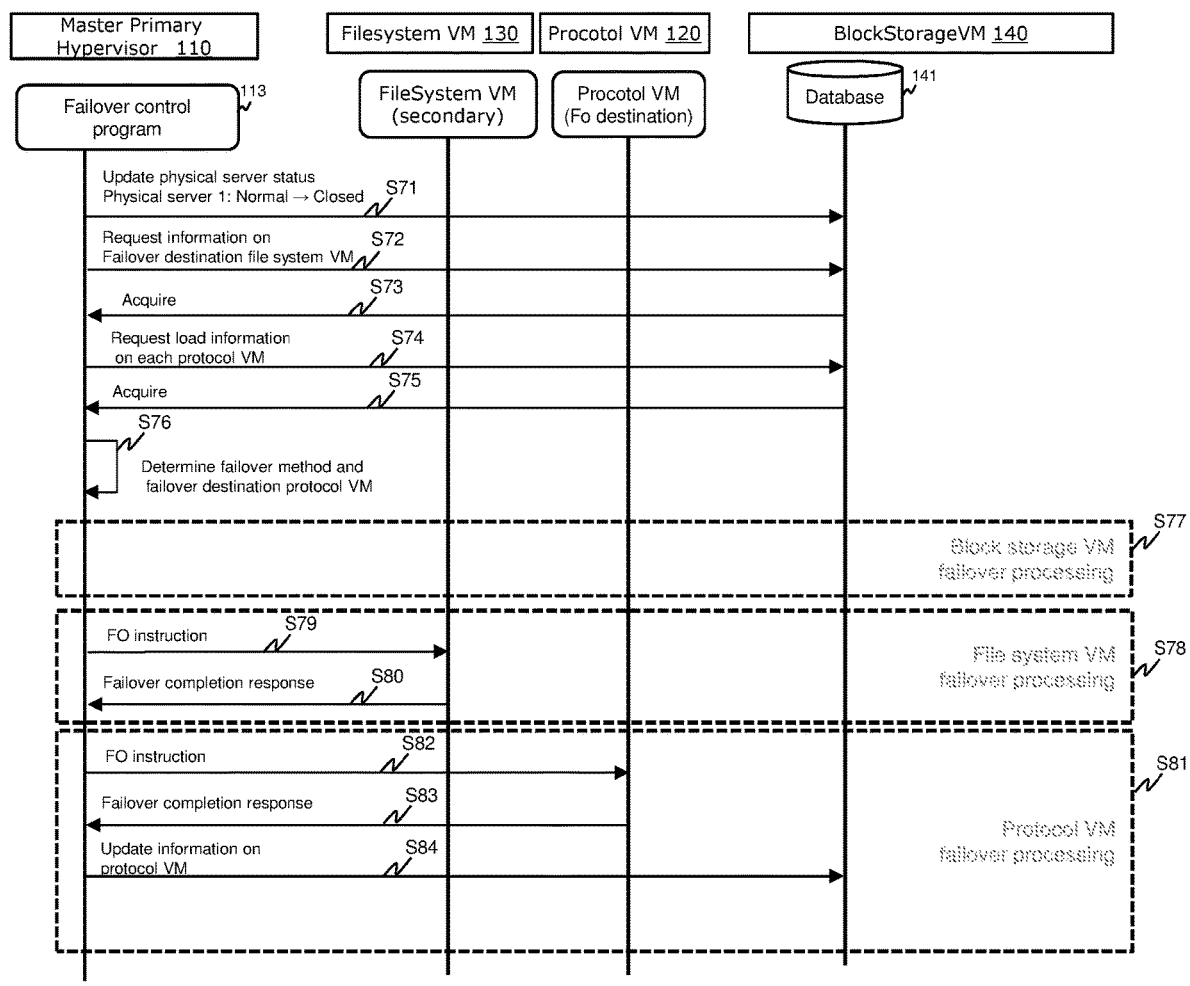
FIG. 15 is a sequence diagram of failover processing for the case where there is a protocol VM with a low load, according to the embodiment.

FIG. 15 is a sequence diagram of the failover processing for the case where there is a protocol VM with a low load, according to the embodiment.

The failover control program 113 configures, to "closed", the status 166*b* for the failed physical server 100 in the physical server status table 166 stored in the database 141 of the block storage VM 140 (step S71).

Then, the failover control program 113 requests the block storage VM 140 to acquire information on the failover destination file system VM 130B from the file system VM pair configuration table 165 in the database 141 (step S72), and acquires the information accordingly (step S73).

Then, the failover control program 113 requests the block storage VM 140 to acquire load information (the CPU usage rate and the memory usage amount) of each protocol VM of the physical servers other than the failed physical server from the protocol VM management table 162 in the database 141 (step S74), and acquires the load information of each protocol VM accordingly (step S75).

The failover control program 113 determines, based on the load information of the protocol VMs, a failover method and a failover destination (step S76). Here, in the example of FIG. 15 indicating the case where there is a protocol VM with a low load, a method for transferring the process to an existing protocol VM with a low load is determined, and the failover destination is determined to be the existing protocol VM with a low load.

The failover control program 113 performs processing for failover of the block storage VM 140 of the failed physical server to a physical server other than the failed physical server (step S77). The processing of failover of the block storage VM 140 may be any existing method.

Then, the failover control program 113 performs processing for failover of the file system VM 130 of the failed physical server to a physical server other than the failed physical server (step S78). Specifically, the failover control program 113 instructs the secondary file system VM 130B paired with the primary file system VM 130A of the failed physical server to perform the failover (instruct to activate the secondary file system VM 130B) (step S79). In response to this failover instruction, the file system VM 130B starts performing the same processing as in the file system VM 130A, and sends a failover completion response to the failover control program 113 (step S80).

Then, the failover control program 113 performs processing for failover of the protocol VM 120 of the failed physical server to a physical server other than the failed physical server (step S81). Specifically, the failover control program 113 instructs the protocol VM 120 determined as the failover destination to perform the failover for transferring the process related to the connection of the user of the protocol VM 120 of the failed physical server (step S82). In response to this, the failover destination protocol VM 120 starts performing the transferred process, and sends a failover completion response to the failover control program 113 (step S83).

Then, the failover control program 113 updates the protocol VM management table 162 with respect to the information changed for the failover of the protocol VM 120 (step S84), and the failover control program 113 ends the processing.

Next, failover processing for the case where there is no protocol VM with a low load in the physical servers other than the failed physical server will be described in detail.

Figure 16:
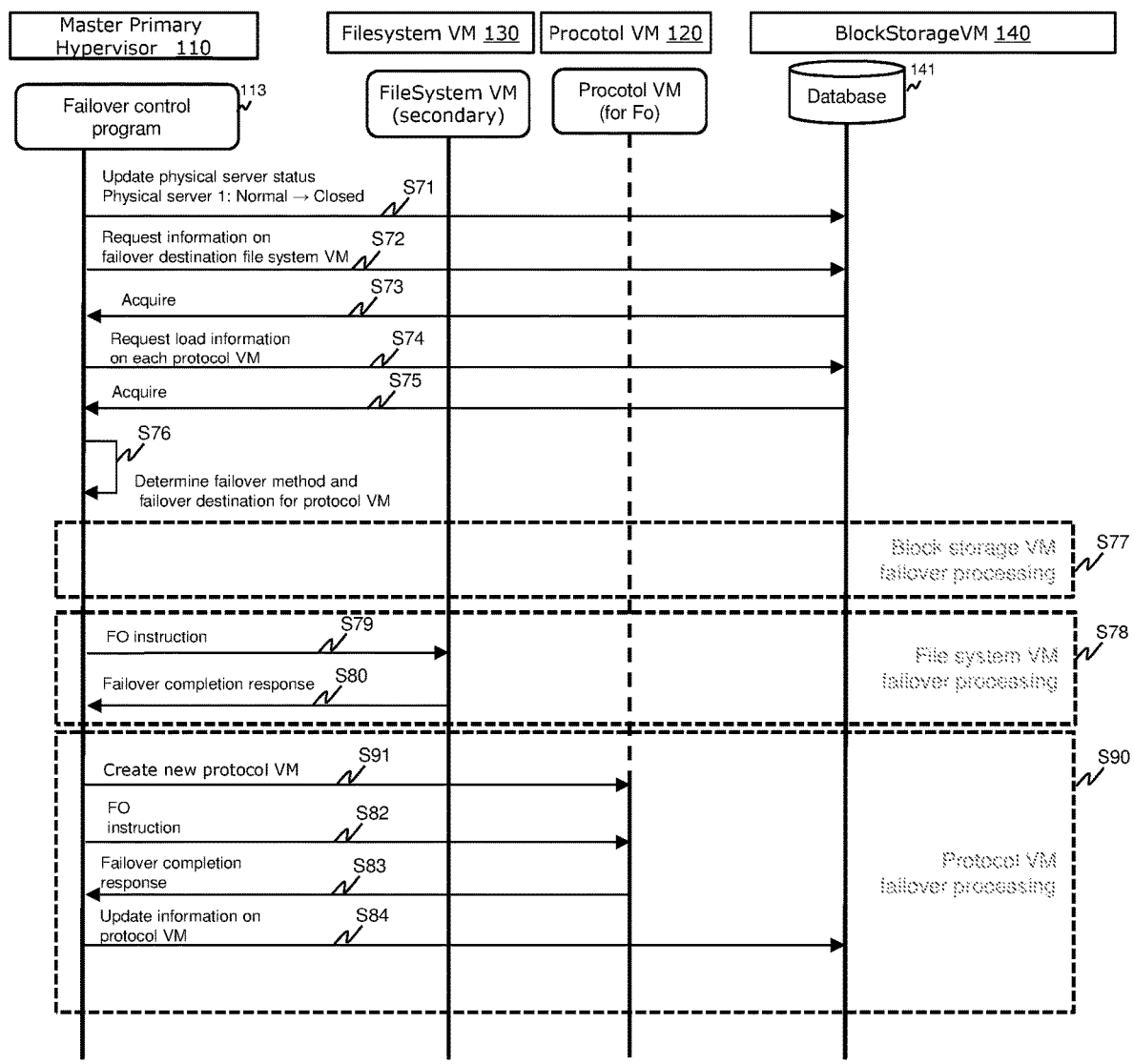
FIG. 16 is a sequence diagram of failover processing for the case where there is no protocol VM with a low load, according to the embodiment.

FIG. 16 is a sequence diagram of the failover processing for the case where there is no protocol VM with a low load, according to the embodiment. Note that the same processing steps as the failover processing shown in FIG. 15 are designated by the same reference symbols and duplicated description will be omitted.

In step S76, in the example of FIG. 16 indicating the case where there is no protocol VM with a low load, a method for creating a new protocol VM and transferring the process to the created protocol VM is determined, and the newly created protocol VM is determined as the failover destination.

After step S80, the failover control program 113 performs processing for failover of the protocol VM 120 of the failed physical server to a physical server other than the failed physical server (step S90). In this processing, the failover control program 113 causes the hypervisor 110 of a physical server having a free resource among the physical servers other than the failed physical server to create a new protocol VM 120 (step S91), and sets the created protocol VM 120 as the failover destination.

As described above, according to the present embodiment, failover of a file system VM to another physical server independently of protocol VMs is performed, so that it is possible to suppress the amount of resources required for the other physical server for the failover.

Note that the present invention is not limited to the above embodiment, and can be appropriately modified and implemented without departing from the spirit of the present invention.

In the above-described embodiment, for example, in order to avoid a load caused by the transfer of various types of data for managing files due to the increase and decrease of the file system VM 130, the control to adjust the number of file system VMs 130 is not performed. However, the present invention is not limited to this, and the number of file system VMs 130 may be adjusted to adjust the amount of resources allocated to the file system VMs 130 in the physical server 100.

Further, in the above-described embodiment, the unit for allocation of the CPUs 152 as resources is the number of CPUs 152, but the present invention is not limited to this. For example, the unit for allocation of the CPUs 152 as resources may be a CPU core of the CPUs 152, and the unit for allocation of the CPUs 152 as resources may be a processing time of the CPU 152 or the CPU core.

Further, in the above-described embodiment, the failover control program 113 is executed by the hypervisor 110, but the present invention is not limited to this. For example, another VM such as the block storage VM 140 may execute the failover control program 113.

Further, in the above-described embodiment, the secondary file system VM 130B is set to a standby state so that the failover can be performed at an early stage, but the present invention is not limited to this. For example, a secondary file system. VM 130B may be configured at the time of failover and then start operation.

Further, in the above-described embodiment, a part or all of the processing to be performed by the CPU may be performed by a hardware circuit. Further, the program in the above-described embodiment may be installed from a program source. The program source may be a program distribution server or a recording medium (e.g., a portable recording medium).

What is claimed is:

1. A storage system comprising a plurality of physical servers, wherein
in the plurality of physical servers one or more protocol virtual machines and one or more file system virtual machines are created to which resources of the physical servers are allocated, the protocol virtual machines performing processing related to a protocol for a file storage with a client via a network, the file system virtual machines performing processing related to file management in the file storage, and
a first physical server, when a failure occurs in a second physical server, causes a physical server other than the second physical server to operate an alternative file system virtual machine to be operated in place of the file system virtual machine of the second physical server, and controls the protocol virtual machine of the physical server other than the second physical server to perform processing to be performed by the protocol virtual machine of the second physical server.

2. The storage system according to claim 1, wherein the alternative file system virtual machine to be operated in place of the file system virtual machine of each of the plurality of physical servers is configured in another physical server, and the first physical server, when a failure occurs in the second physical server, causes the alternative file system virtual machine of another physical server to be operated in place of the file system virtual machine of the second physical server to start operating in place of the file system virtual machine of the second physical server.

3. The storage system according to claim 2, wherein
the first physical server, when causing the alternative file system virtual machine to start operating in place of the file system virtual machine of the second physical server, increases an amount of resources for the second physical server allocated to the alternative file system virtual machine.

4. The storage system according to claim 2, wherein,
in the plurality of physical servers, alternative file system virtual machines to be operated in place of the file system virtual machine of another physical server are distributed and arranged.

5. The storage system according to claim 1, wherein
the first physical server, when a failure occurs in the second physical server, determines whether there is a protocol virtual machine with a load less than a predetermined load in the protocol virtual machines of the physical servers other than the second physical server, and controls, when there is a protocol virtual machine having a load less than the predetermined load, the protocol virtual machine to perform processing by the protocol virtual machine of the second physical server.

6. The storage system according to claim 5, wherein
the first physical server controls, when there is no protocol virtual machine with a load less than the predetermined load, a physical server having a free resource to create a new protocol virtual machine that performs the processing in place of the protocol virtual machine of the second physical server.

7. A failover control method performed by a storage system including a plurality of physical servers, wherein
in the plurality of physical servers, one or more protocol virtual machines and one or more file system virtual machines are created to which resources of the physical servers are allocated, the protocol virtual machines performing processing related to a protocol for a file storage with a client via a network, the file system virtual machines performing processing related to file management in the file storage, and
a first physical server, when a failure occurs in a second physical server, causes a physical server other than the second physical server to operate an alternative file system virtual machine to be operated in place of the file system virtual machine of the second physical server, and controls the protocol virtual machine of the physical server other than the second physical server to perform processing to be performed by the protocol virtual machine of the second physical server.

8. A non-transitory computer-readable recording medium that stores a failover control program to be executed by a physical server of a storage system including a plurality of physical servers, wherein
in the plurality of physical servers, one or more protocol virtual machines and one or more file system virtual machines are created to which resources of the physical servers are allocated, the protocol virtual machines performing processing related to a protocol for a file storage used in communication with a client via a network, the file system virtual machines performing processing related to file management in the file storage, and
the failover control program causes a first physical server to
cause, when a failure occurs in a second physical server, a physical server other than the second physical server to operate an alternative file system virtual machine to be operated in place of the file system virtual machine of the second physical server, and
control the protocol virtual machine of the physical server other than the second physical server to perform processing to be performed by the protocol virtual machine of the second physical server.

* * * * *